United States Patent
Braman et al.

(10) Patent No.: US 6,667,021 B2
(45) Date of Patent: Dec. 23, 2003

(54) METHOD FOR PRODUCING ENHANCED SODIUM CARBONATE CRYSTALS FOR MAKING SODIUM BICARBONATE

(75) Inventors: Victor Eugene Braman, Green River, WY (US); Marco Antonio Cortes, Green River, WY (US); Stephen Tremayne Gaddis, Sweetwater, WY (US); Kenneth Douglas Boyle, Sweetwater, WY (US)

(73) Assignee: General Chemical Corporation, Parsippany, NJ (US)

(*) Notice: Subject to any disclaimer, the term of this patent is extended or adjusted under 35 U.S.C. 154(b) by 141 days.

(21) Appl. No.: 09/950,875

(22) Filed: Sep. 12, 2001

(65) Prior Publication Data

US 2003/0049192 A1 Mar. 13, 2003

(51) Int. Cl.$^7$ .............................. C01D 7/00; C01D 7/10
(52) U.S. Cl. .................... 423/422; 423/421; 423/206.2; 23/302 T
(58) Field of Search .......................... 423/202, 206.2, 423/266, 421, 422, 426; 299/4, 5; 23/297, 298, 302 T

(56) References Cited

U.S. PATENT DOCUMENTS

| | | |
|---|---|---|
| 3,981,686 A | 9/1976 | Lobunez et al. |
| 4,472,280 A | 9/1984 | Keeney |
| 5,238,664 A | 8/1993 | Frint et al. |
| 5,262,134 A | 11/1993 | Frint et al. |
| 5,283,054 A | 2/1994 | Copenhafer et al. |
| 5,609,838 A | 3/1997 | Neuman et al. |
| 5,618,504 A | 4/1997 | Delling et al. |
| 5,624,647 A | 4/1997 | Zolotoochin et al. |
| 5,736,113 A | 4/1998 | Hazen et al. |
| 5,759,507 A | 6/1998 | Delling et al. |
| 5,766,270 A | 6/1998 | Neuman et al. |
| 5,911,959 A | 6/1999 | Wold et al. |
| 5,955,043 A | 9/1999 | Neuman et al. |
| 5,989,505 A | 11/1999 | Zolotoochin et al. |
| 6,010,672 A | 1/2000 | Turner |
| 6,228,335 B1 | 5/2001 | Copenhafer et al. |
| 6,270,740 B2 | 8/2001 | Shepard et al. |
| 2001/0001037 A1 | 5/2001 | Tanaka et al. |

*Primary Examiner*—Steven Bos
*Assistant Examiner*—Anthony Kuhar
(74) *Attorney, Agent, or Firm*—Arthur J. Plantamura

(57) ABSTRACT n the manufacture of sodium carbonate having increased $CO_2$ uptakes the carbonation reaction to form sodium bicarbonate is enhanced by the addition of particular amounts of a cationic quaternary amine, selected from the family of dialkylethoxylated quaternary salts, benzylalkyl quaternary salts, or a combination of quaternary salts from these families, to treat the 25–30% by weight sodium carbonate liquor prior to filtration. The manufactured product yields a modified sodium carbonate liquor product that, when crystallized and converted to any anhydrous product, is more readily carbonated with $CO_2$ in the production of sodium bicarbonate. The cationic additive reacts with organic materials in the sodium carbonate liquor to form solid polymeric by-products. Thus the treatment with a cationic compound is made prior to filtering the liquor. After filtering to remove the polymeric by-products and other solid materials, the liquor is evaporated or crystallized to produce a purified and modified sodium carbonate. During evaporation, additional antifoam agent may be added to control foaming and insure the ability to re-use the generated condensate.

17 Claims, 1 Drawing Sheet

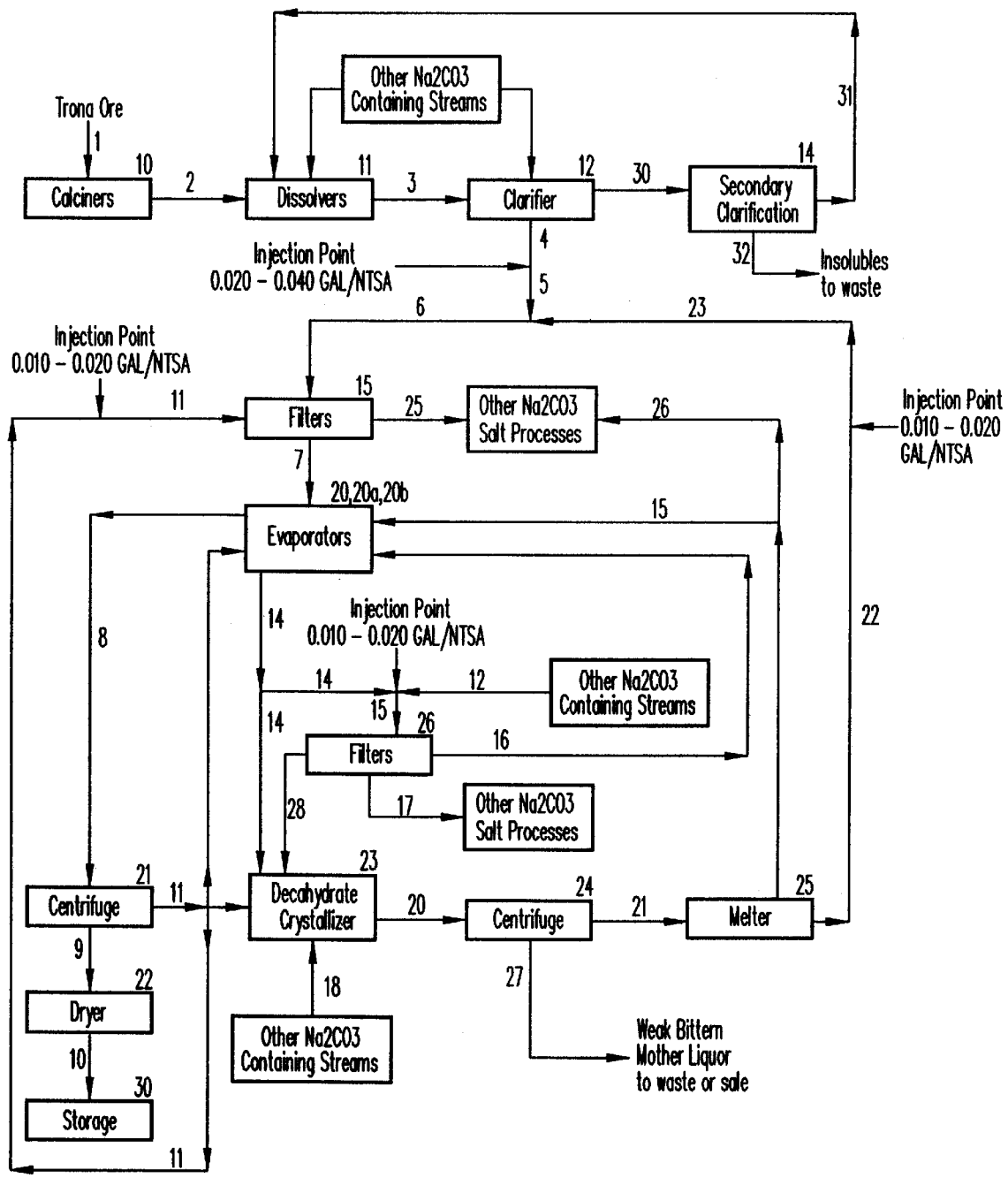

METHOD FOR PRODUCING ENHANCED SODIUM CARBONATE CRYSTALS FOR MAKING SODIUM BICARBONATE

This invention relates to an improved process for producing an amended sodium carbonate product. More particularly, this invention relates to the manufacture of a sodium carbonate product, solids and/or liquor, that has an enhanced reactivity with carbon dioxide for the production of sodium bicarbonate free of the use during manufacture of additives that includes animal derivatives.

BACKGROUND OF THE INVENTION

Trona ore is mined and calcined for use in the manufacture of sodium carbonate which in turn can be used to make sodium bicarbonate ($NaHCO_3$), a valuable product. The naturally occurring trona ore material generally has the formula $Na_3H(CO_3)_2 \cdot 2H_2O$ and is characterized as a hydroxyacid sodium carbonate. Trona is found in, or contiguous to, oil shale, and thus, contains large amounts of organics, which it is desirable to remove from the sodium carbonate product. Unfortunately, insoluble organic and inorganic materials are contiguous in the trona ore, and are not easily separated. These impurities impact the characteristics of the final soda ash produced.

The processes used to remove impurities and to produce commercial soda ash from crude trona ore include various steps of calcination, dissolution of the converted soda ash to concentrated liquor, solids/liquids separation steps, filtration and/or purification, evaporation/crystallization, and drying the monohydrate formed to anhydrous soda ash for industrial use.

In accordance with the present commercial process, the crushed and calcined trona ore is treated with water to dissolve the soluble sodium carbonate product. The resultant liquid solution, or liquor, is clarified, decanted and then filtered to remove the solids. Treatment of the solution with activated carbon may follow to remove some portion of the organic materials. However, treatment with activated carbon is expensive. In addition to the high costs of the activated carbon itself, there are several auxiliary processing costs; the carbon must be filtered out after the carbon is sufficiently inactivated, requiring additional manpower, testing and filtering equipment, and the spent carbon must be disposed of, which is also expensive.

After the carbon treatment step, when used, the liquor is evaporated to obtain a crystallized sodium carbonate product. Antifoam agents are often added in this step to prevent foaming that would foul condensing liquids. These liquids are reused as pure water when clean enough.

The pregnant mother liquor separated from the monohydrate crystals is recycled back to the evaporation units to recover the alkali value therein. Eventually the impurities in the liquors concentrate and a portion must be purged from the evaporation step to meet product quality requirements. The sodium decahydrate crystallization process is one process used to recover the alkali values in the waste purge stream.

Other waste streams and sodium carbonate-containing streams can be cooled using the sodium carbonate decahydrate process to recover alkali values from weak liquor streams. The crystals formed are separated from the weak bittern mother liquor and can be melted and conveniently reintroduced into the monohydrate process or used as feed stock to other sodium crystallization processes such as sodium bicarbonate and sodium sesquicarbonate. The resulting weak bittern mother liquor is also valuable as an alkalinity source for such processes as flue-gas desulfurization. The sodium carbonate decahydrate process is a valuable process for recovering alkali values from sodium carbonate processes.

When the sodium carbonate product is to be used to make sodium bicarbonate, the anhydrous soda ash is dissolved in water and the resultant sodium carbonate solution is then reacted with carbon dioxide to form sodium bicarbonate in accordance with the following reaction:

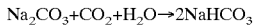
$$Na_2CO_3 + CO_2 + H_2O \rightarrow 2NaHCO_3$$

However, even if treated with activated carbon, objectionably some organic materials from the anhydrous soda ash are passed on to the sodium bicarbonate process. This residual organic material interferes with its ability to react with carbon dioxide.

Thus considerable engineering skill is needed to maximize the carbon dioxide adsorption efficiency of sodium carbonate and the rate of sodium bicarbonate crystal formation from sodium carbonate. An improved method for modifying the sodium carbonate source that enhances the carbonation reaction and avoids animal derivatives would be highly advantageous.

Sodium carbonate produced from the conventionally mined trona ore via the "monohydrate" process is known to contain dissolved organic matter and other insoluble materials. The liquor produced by dissolving the crude soda ash is sometimes treated with carbon to remove the dissolved organic matter which may cause foaming, crystal modification, and/or color problems in the final product. Sodium carbonate monohydrate crystals formed in the evaporation process are separated from the mother liquor and sent to the dryers to produce soda ash. The soluble impurities are recycled with the centrate to the crystallizer where they are further concentrated. To maintain final product quality, it eventually becomes necessary to remove the impurities with a crystallizer purge stream.

The purge stream from the evaporation process is sometimes cooled crystallizing sodium carbonate decahydrate and separating the decahydrate crystals to recover the alkali values therein. The decahydrate crystals can be melted and returned to the centrate system, or melted and fed directly to an evaporation unit, or used as a sodium source for the production of saleable sodium salts (e.g. dense soda ash, light soda ash, sodium bicarbonate, or sodium sesquicarbonate.)

The liquors from the separation, purification, and/or purge steps maybe sent to surface evaporation ponds or to abandoned underground mine workings. The sodium carbonate containing liquors from such disposals and/or natural mine waters, can be cooled using the "decahydrate" process to improve the purity of the crystals produced while recovering the sodium values therein. Sodium carbonate decahydrate formed when such waste streams are naturally or mechanically cooled can also be melted, filtered and purified, and re-cooled using the "decahydrate" process. The recovered alkali value can then be further processed to valuable sodium carbonate salts (e.g. sodium sesquicarbonate, sodium carbonate, or sodium bicarbonate).

The production of sodium carbonate using a combination of monohydrate and decahydrate processes is well known. Purification methods using carbon filtration and chemical additives such as DADMAC, quaternary amines, bentonite clays, and guar gums have been documented and patented.

For example, a method for removing anionic polymers and acidic impurities from aqueous trona solutions prior to crystallization whereby improved crystal formation is achieved is proposed in U.S. Pat. No. 4,472,280, to Keeney.

U.S. Pat. No. 3,981,686, to Lobunez teaches a method for clarifying a carbonate process solution containing suspended insolubles so the suspended insolubles will readily settle out of the carbonate process solution.

U.S. Pat. No. 6,270,740 to Shepard, et al, issued in May, 2001 teaches a process comprising adding an amine additive at a rate of at least 0.017 gallons per ton of sodium carbonate produced, prior to the filtration step of the monohydrate process that results in modified sodium carbonate crystals which, when dissolved in water, have increased reactivity with carbon dioxide in the manufacture of sodium bicarbonate.

Presently, these processes include the presence of at least one nitrogen containing cationic compound chosen from the group consisting of water-soluble cationic polymers and/or fatty substituted quaternary ammonium salts.

Certain dietary requirements limit the use of animal derivatives. For instance, Kosher diets restrict among other things, fats derived from swine and other forbidden animals. Compounds produced from bovine bi-products present concern with bovine spongiform encephalopathy (mad cow disease) and other animal transmitted diseases. A process for producing saleable sodium salts without the use of animal derivatives would be beneficial.

The present invention differs from the system of U.S. Pat. No. 6,270,740 to Shepard, et al, in that the system of that patent employs tallow-based or fatty substituted quaternary amines, while the system of the present invention requires a quaternary amine that is free of animal derivatives. In accordance with the invention the two amine groups comprising suitable non-tallow or non-fatty substituted carbon structure, that yield the desired benefits are:

a) Dialkylethoxilated quaternary salts
 b) Benzylalkyl quaternary salts.

We have found that in order to achieve the desired result, the non-tallow based, non-fatty substituted amine salt must be employed at a rate of about 0.020 to about 0.040 mols/min. Although these addition rates may be regarded as comparable to the addition rates of the tallow-based amines, the chemistry of the tallow-based amines is found to react substantially differently such that if one adds more than about 0.020 mols/min of the tallow-based amine, there is a marked reduction in the product's $CO_2$ uptake, as shown by the table below:

TABLE 1

| $CO_2$ Reactivity & Concentration | |
|---|---|
| Tallow-Based Amine Gal/Ton SA | $CO_2$ Uptake Mols/Min |
| 0.010 | 0.0087 |
| 0.015 | 0.0091 |
| 0.020 | 0.0106 |
| 0.025 | 0.0104 |
| 0.030 | 0.0067 |
| 0.035 | 0.0067 |
| 0.040 | 0.0068 |

It is apparent that, the product reactivity with respect to $CO_2$ decreases once the addition rate of the tallow-based amine goes above 0.021 mols/min.

SUMMARY OF THE INVENTION

We have found that the carbonation reaction to form sodium bicarbonate is enhanced when the sodium carbonate is produced using the process of the invention. In accordance with the present process, the addition of particular amounts of a cationic compound, e.g., a quaternary amine, to treat the 25–30% by weight sodium carbonate liquor prior to filtration, results in a modified sodium carbonate liquor product that, when crystallized and converted to any anhydrous product, is more readily and more thoroughly carbonated with $CO_2$ in the production of sodium bicarbonate. The cationic additive reacts with organic materials in the sodium carbonate liquor to form solid polymeric by-products. It is necessary that the treatment with a cationic compound is made prior to filtering the liquor. After filtering to remove the polymeric by-products and other solid materials, the liquor is evaporated or crystallized to produce a purified and modified sodium carbonate. During evaporation, additional antifoam agent may be added to control foaming and to insure the ability to re-use the generated condensate.

In addition to exceeding the maximum $CO_2$ reactivity that is achieved with a tallow-based amine (0.0220 vs. 0.0117 mols/min), the benefits of the present invention include treatment of supplementary recycle streams such as purge, mother liquor, and other waste streams such as mine water, underflow tails, bicarbonate waste, etc. This is beneficial because soda ash produced using these sodium carbonate sources, without the advantages of the invention, will produce crystals with substantially lower reactivity, i.e. with reactivities similar to crystals made using conventional monohydrate, decahydrate, bicarbonate, or sesquicarbonate processes. Use of the present invention will produce crystals with reactivities averaging 0.0220 mols/min $CO_2$ uptake. The benefit of the present invention resides in the manufacture of sodium bicarbonate whereby the reactivity of the manufactured sodium carbonate to $CO_2$ in the conversion of the sodium bicarbonate is increased and without introducing chemicals from animal derivatives.

BRIEF DESCRIPTION OF THE DRAWING

The FIGURE comprises a typical flow diagram of the process for producing the improved sodium carbonate product in accordance with the invention.

DETAILED DESCRIPTION OF THE INVENTION

In the course of the work leading to the invention several combinations of non-tallow based quaternary amines were bench tested and screened for effective foam prevention and increased carbon dioxide uptake. Certain preferred amines were discovered and tested for practical commercial production. The goal of retaining Kosher certification of the soda ash being produced for sale was also an important consideration. The testing continued to assure the reproducability of an effective and economic amine system that would yield the desired benefits.

Defoamers from various manufacturers were examined under a pass/fail system for plant trials. This initial screening consisted of establishing physical and chemical characteristics, effectiveness in foam prevention and foam suppression, and the ability to maintain/increase $CO_2$ uptake (BCT). Additionally, crystal size, crystal friability, bulk density, and impurity levels had to remain unchanged.

We have found that the most promising of these defoamers was the dialky ethoxylated amine salt, GD 1103, obtained from Great Divide Chemicals which produced crystals with high $CO_2$ reactivity and performed successfully in plant trials. Additional runs to enhance the foam suppressing ability of this salt were undertaken; first, by increasing the concentration of the dialkylethoxilated amine (Quat 1) and then by adding a second non-tallow based quaternary amine of the family of benzylalkyl quaternary salts (Quat 2). A variety of combinations using these salts individually and in combination were tested to determine the most effective combination. Of the dialkyl and benzyalkyl substituents, generally those sales leaving an alkyl group of 1–4 carbon atoms are included.

Based on this testing, it was found that these salts were effective in obtaining crystals with a high $CO_2$ reactivity while still obtaining good foam control in the process, and that a combination of the chemicals with two quaternary amines yields a preferable result. GD 1110 was also plant tested and proved to have good defoaming properties and produced crystals with an average $CO_2$ reactivity of 0.0220 mols/min.

As the results obtained demonstrate, plant trials confirmed that only certain quaternary amine salt additives in accordance with the present invention significantly increased $CO_2$ reactivity. Although other chemicals tested use benzyl amines and other quaternary salts, they failed to yield a sodium carbonate product with the desired sufficiently high $CO_2$ reactivity. Other amines tested had the adverse effect of modifying the bicarbonate crystal during the manufacture of sodium bicarbonate and lacked crystal size distribution requirements.

In accordance with the invention a more effective and/or less costly mixture resides when the quaternary amine employed is elected from the family of diquaternary salts thereof.

We have found that the diquaternary amine system of the invention yields a superior soda ash. The product produced according to the inventor is distinctively different from that produced using the tallow-based amine described in U.S. Pat. No. 6,270,740 in at least the following respects:

$CO_2$ uptake values averaged 0.012 mols/min with peak values of 0.017 mols/min. $CO_2$ uptake of crystals made with the present invention average 0.0220 mols/min.

$CO_2$ reactivity decreases as the addition rates exceed 0.021 mols/min when using a tallow based amine. Up to 0.040 mols/min of the non-tallow based amine have been added without a decrease of $CO_2$ reactivity.

The amine described in the present invention does not have animal derivatives or fatty substitutes. Consequently, it fulfills certain dietary requirements (e.g. Kosher) and avoids concerns with animal transmitted diseases (e.g. bovine spongiform encephalopathy).

The present invention allows for production of soda ash with high $CO_2$ reactivity from recycle and waste streams that otherwise would have reactivity of 0.0075 mols/min.

Referring to the flow diagram of the drawing, the sequence of steps employed to make the improved modified sodium carbonate product of the invention is described.

As shown, trona ore is mined, crushed and fed to a calciner 10 to burn off volatile products, convert any sodium bicarbonate to carbonate, and liberate water. The calcined product is removed from the calciner 10 and the soluble salts are dissolved in water in a dissolver 11 to form a 25–30% by weight soda ash solution, which in turn is fed to a clarifier 12. The supernatant liquor is removed through a line 4, and the solids remaining at the bottom of the clarifier 12 are removed through a line 30. The solids may be re-clarified in a second clarifier 14 and the supernatant solution withdrawn at line 31 and returned to the dissolver 11 as dissolver liquor supply.

A cationic additive is suitably injected into line 4 prior to the filter 15. The resultant liquor/additive solid polymeric reaction product is filtered in a filter 15. The filtered stream is evaporated by a single evaporator 20 where water is removed leaving a product slurry. Multiple evaporators, such as a second effect evaporator 20A and a third effect evaporator 20B can also be employed. Antifoam agent is added to the first effect evaporator 20 continuously and batch-wise to the second and third effect evaporators 20A and 20B solely to control foam generation. This slurry is fed to a centrifuge 21 where a modified monohydrate crystal sodium carbonate product is collected. This product is then fed to a steam tube dryer 22 where the water of hydration is removed. The resultant anhydrous sodium carbonate product is optionally and preferably screened and collected for storage in storage bins 30.

The pregnant mother liquor (line 11) separated from the modified monohydrate crystal sodium carbonate product is recycled back to the evaporator units where it is further concentrated with impurities. To maintain final product quality, it eventually becomes necessary to remove the impurities with a crystallizer purge stream (line 14).

It is economically advantageous to recover alkali values from the mother liquor and purge streams, which are highly concentrated in sodium carbonate. It is further advantageous to purify these streams by reducing the concentration of impurities returned to the evaporator units as recycle.

In some cases, the purge stream (line 14) is cooled crystallizing sodium carbonate decahydrate (23) and separating the decahydrate crystals (24) to recover the alkali values therein. The separated solid sodium carbonate decahydrate crystals (line 21) can be melted (25) and recycled back to evaporator units (20) or further processed into saleable sodium salts (line 26) (e.g. sodium carbonate, sodium bicarbonate or sodium sesquicarbonate). The weak bittern mother liquor stream (line 27) from the decahydrate crystallizer is suitable for flue-gas desulfurization, or can be stored at a surface or underground facility for future recovery.

The decahydrate process is also suitable for purifying the pregnant mother liquor stream and recovered waste streams from such sources as surface or underground tailings, mine waters, recycle streams from a sodium bicarbonate process, and other sodium carbonate containing streams with recoverable alkali values.

A cationic additive is suitably injected into the process prior to a final filtration. When the sodium carbonate-containing stream is fed to a decahydrate crystallizer, a quaternary amine is preferably injected into the melted decahydrate crystal containing stream followed by filtration prior to being fed as recycle to a monohydrate evaporator unit, or used as a feed source for other sodium salt processes such a sodium bicarbonate or sodium sesquicarbonate. The preferred cationic amine addition rate is 0.010–0.020 gallons per equivalent soda ash produced accounting for the recoverable sodium carbonate decahydrate.

When the sodium carbonate-containing stream is fed to a monohydrate evaporator unit, or other crystallizing units such as used to produce such sodium carbonate compounds as sodium bicarbonate or sodium sesquicarbonate, a quaternary amine is suitably injected into the process stream followed by filtration prior to the introduction to the processing units. The preferred cationic amine addition rate is 0.010–0.020 gallons per equivalent soda ash produced accounting for the recoverable sodium carbonate decahydrate.

The mother liquor (line 11) is preferably cooled using a decahydrate crystallizer (23) to further purify the feed stream (line 7) to the evaporator units and recover alkali values therein. The solid sodium carbonate decahydrate crystals are separated (24) and can be melted (25), the cationic additive injected at a preferred rate of 0.010–0.020 gallons per equivalent ton of sodium carbonate recovered, the resultant liquor produced filtered and recycled back to the sodium monohydrate evaporator units (20) or further processed into other sodium carbonate-containing salt crystals such as sodium bicarbonate or sodium sesquicarbonate crystals (line 25).

The purge liquor (line 14) is preferably cooled using a decahydrate crystallizer (23) to further purify the feed stream (line 7) to the evaporator units (20) and recover alkali values therein. The solid sodium carbonate decahydrate crystals are separated (24) and can be melted (25), the cationic additive injected at a preferred rate of 0.010–0.020 gallons per equivalent ton of sodium carbonate recovered, the resultant liquor produced filtered and recycled back to the sodium monohydrate evaporator units (20) or further processed into other sodium carbonate-containing salt crystals such as sodium bicarbonate or sodium sesquicarbonate crystals (line 25).

Other sodium carbonate-containing streams (such as surface or underground tailings, mine waters, and other recycle and/or waste streams) may be introduced to the process and adjusted in concentration to economically recover sodium carbonate values therein. The benefits of this invention are not efficiently realized when the cationic amine is added to the process streams prior to the clarification steps. When said sodium carbonate-containing streams enter the process as feed to the dissolving or clarification steps, some of the amine exits the system with the insoluble underflow materials. In these processing instances it is preferred that the amine be added to the resultant supernatant liquor then filtered prior to reporting to the monohydrate evaporation units. The preferred amine addition rate is 0.020–0.040 gallons of amine per ton of soda ash produced, accounting for the equivalent sodium carbonate recovered from the waste streams plus the sodium carbonate recovered from the virgin liquor stream into which the recovery stream was introduced.

Other sodium carbonate-containing streams (such as surface or underground tailings, mine waters, and other recycle and/or waste streams) may be introduced to a sodium carbonate decahydrate process after an adjustment for concentration to economically recover sodium carbonate values therein. In these processing instances it is preferred that the sodium carbonate value be recovered firstly by cooling with a decahydrate crystallizer (23) and the resultant crystals be melted (25), the cationic amine suitably injected into the resultant liquor, followed by filtration prior to reporting to downstream crystallization units. The preferred amine addition rate is 0.010–0.020 gallons of amine per ton of soda ash produced, accounting for the equivalent sodium carbonate recovered from the waste streams.

Other sodium carbonate-containing streams (such as surface or underground tailings, mine waters, and other recycle and/or waste streams) may be introduced to a sodium carbonate decahydrate process after an adjustment for concentration to economically recover sodium carbonate values therein. In processing instances where the sodium carbonate-containing stream is filtered first, followed by cooling using a decahydrate crystallizer to recover the alkali values therein for processing to sodium carbonate salts, the cationic amine is suitably injected into the process stream prior to filtration (26) at a preferred amine addition rate of 0.010–0.020 gallons of amine per ton of soda ash produced, accounting for the equivalent sodium carbonate recovered from the waste streams plus sodium carbonate recovered from the virgin liquor stream into which the recovery stream was introduced.

The mother liquor (line 11) may be filtered to remove impurities prior to reporting as recycle or feed to a sodium monohydrate, sodium decahydrate, or other evaporator/crystallizers used to produce sodium carbonate-containing salts. In this case, the cationic additive is injected prior to the filtration step at a preferred rate of 0.010–0.020 gallons per equivalent ton of sodium carbonate recovered, the resultant filtered liquor recycled back to monohydrate evaporator units or further processed into other sodium carbonate salt crystals such as sodium bicarbonate or sodium sesquicarbonate crystals.

The purge liquor (line 14) may be filtered to remove impurities prior to reporting as recycle or feed to a sodium monohydrate, sodium decahydrate, or other evaporator/crystallizers used to produce sodium carbonate-containing salts. In this case, the cationic additive is injected prior to the filtration step at a preferred rate of 0.010–0.020 gallons per equivalent ton of sodium carbonate recovered, the resultant filtered liquor recycled back to monohydrate evaporator units or further processed into other sodium carbonate salt crystals such as sodium bicarbonate or sodium sesquicarbonate crystals.

The cationic surfactant compounds useful in the invention comprise organo quaternary amines, and in particular dialkylethoxylated quaternary amine salts, benzyl alkyl quaternary amine salts, or a combination of both salts or a blend thereof with a non-tallow, non-fatty substituted carbon chain builder. The amine additive is injected into the mother liquor obtained from the primary clarifier 12 prior to filtering. The quantity of amine additive added to the liquor is from 0.020 to 0.040 gallons of the amine per ton of soda ash produced. Forty to seventy percent of the total addition must be added to the filtration feed pipeline 6. The production rate of soda ash can be calculated based on the measured soda ash liquor concentration and liquor feed rate entering the evaporator (20) or decahydrate crystallizer (23) bodies, less the system losses due to purge, centrifuge recycle and dryer losses caused by air flow entrainment and the like. The quantity of amine additive added to other liquor sources such as melted decahydrate, mine waters, recovered waste streams from surface or underground tailings, other sodium containing streams and recycle streams is from 0.010 to 0.020 gallons per equivalent soda ash recovered from said streams. The calculation accounts for feed concentration, feed rate, recovery and losses. It is preferred that the amine be added to such streams after crystallization from such processes as a decahydrate crystallizer, the crystals separated from the weak bittern mother liquor, melted, and filtered. The amine addition point is after, i.e. follows, the melting step and is prior to the filter step. Alternatively, the amine addition point may occur prior to a filtration step and followed by monohydrate evaporation, decahydrate crystallization, or other crystallization step such as production of sodium bicarbonate or sodium sesquicarbonate.

Adherence to the present process sequence results in a modified anhydrous soda ash product with a very substantially improved reactivity, or uptake, of carbon dioxide in the production of sodium bicarbonate. About 200% or higher carbon dioxide uptake over that of an activated carbon-treated sodium carbonate product, and about 290% over that of the untreated prior art sodium carbonate product, is obtained when all the amine is added to the evaporators with no pre-filtration. Further, since the polymeric by-products formed by reaction of the cationic additive and the organic materials are filtered prior to feeding to the crystallizer, this does not exhaust the foam control capability of the residual amine. However, the addition of the antifoaming agent directly to the second and third effect evaporators in a batch-wise manner may be reduced or even eliminated.

Although organo quaternary amines have been used as surfactants in the past to control foaming that occurs in the evaporator/crystallizer system the presence of the surfactants in the liquor, still containing organic materials, is thought to produce aliphatic carboxylic acids. And, although the exact reasons for the improved results in accordance with the present invention are not entirely understood, it is believed that it is these aliphatic organic acids that negatively affect the carbonation step.

The present process permits removal of more of the objectionable organic impurities in the original liquor, and the reactivity of the soda ash product is enhanced. The present product has the reactivity of a much purer soda ash, and thus more organics can be tolerated in the sodium carbonate product obtained in accordance with the invention. Thus the present process is more tolerant of changes in organics content of the soda ash solutions, which may vary with their natural source.

Although the level of organics in the sodium carbonate solution in the evaporators may still be within the usual range or 200–300 ppm present in the feed stream after activated carbon treatment of the liquor, the use of the present cationic additives, in the required amounts, to the mother liquor prior to the filtration step, unexpectedly enhances the ability of the sodium carbonate to react with $CO_2$ in the carbonation step to form NaHCO3. This unexpected enhancement in productivity is about 290%. Further, foaming at the evaporator/crystallizer is controlled without increases in the addition rate, and the overall production cost for producing sodium bicarbonate from natural sources is not increased.

Using a no-pre-filtration antifoam addition to the evaporators, the uptake of $CO_2$ to form sodium bicarbonate is about 0.0075 mols/min. Using an activated carbon treated sodium carbonate solution, the uptake reached about 0.011 mols/min., more than an order of magnitude higher. Using a tallow-based amine as described in U.S. Pat. No. 6,270,740, uptake values averaged 0.012 mols/min. with peak values of 0.017 mols/min. uptake of carbon dioxide.

The soda ash produced using the process of the invention were further compared to results using various carbon filtering schemes; the more significant observations are summarized below:

a. The amine additive should be introduced continuously into the liquor stream, rather than added to the evaporator batchwise as is typically done in monohydrate processes for foam control. In accordance with the invention, values above 0.022 mols/min have been achieved when at least 40–70% of the amine additive is added to the liquor which is filtered prior to evaporation/crystallization.

b. At least 0.020 gallons of amine additive per ton of soda ash to be produced should be introduced into the virgin liquor to initiate the improvement found herein. It is preferred that between 0.020 and 0.040 gallons of amine additive per ton of soda ash to be produced be added. The amine should primarily be introduced prior to the filtration step, but the balance can be added to control evaporator foaming.

c. At least 0.010 gallons of amine additive per ton of soda ash to be produced should be introduced into other sodium carbonate-containing streams, i.e., non-virgin liquor streams, with the intent of recovering the sodium carbonate values therein using evaporation/crystallization processes such as the "monohydrate", "decahydrate", or "sodium bicarbonate" processes. It is preferred that the amine salt be added prior to a filtration step followed by the evaporation or crystallization. In processes where the sequence is evaporation/crystallization followed by melting of crystals for re-introduction as feed to a "monohydrate" or "sodium bicarbonate" process, it is important that at least 0.010 gallons of amine salt additive per ton of equivalent soda ash value in the recovered liquor be introduced into the liquor stream after the melting step and prior to a filtration step to initiate the improvement found herein. It is preferred that between 0.010 and 0.020 gallons of amine additive per ton of equivalent soda ash to be recovered be added.

d. At least 0.010 gallons of amine additive per ton of soda ash to be produced should be introduced into other sodium carbonate-containing streams with the intent of recovering the sodium carbonate values therein whereby further purification of the stream is achieved by filtering. It is preferred that the amine be added prior to a filtration step followed by the evaporation or crystallization. It is preferred that between 0.010 and 0.020 gallons of amine additive per ton of equivalent soda ash to be recovered be added.

When pre-filtration is not used, the reactivity for $CO_2$ adsorption in the sodium bicarbonate is only about 0.0075 mols/min. Using an activated carbon treated sodium carbonate solution, the uptake reached about 0.011 mols/min. Using a tallow-based quaternary amine salt added prior to filtration achieved an average 0.012 mols/min. with peak values reaching 0.017 mols/min. uptake for $CO_2$. However, when using the system of the invention with a non-tallow based quaternary amine feed rate of 0.020–0.040 gallons per ton of soda ash produced with at least 40–70% of the total amine added introduced prior to filtration of the virgin liquor streams, increases averaged 0.022 mols/min. uptake of carbon dioxide were achieved.

Additionally, using the present process with a non-tallow based quaternary amine feed rate of 0.010–0.020 gallons per ton of soda ash recovered, the entire quantity being added to the sodium carbonate-containing stream introduced with the intent of recovering the sodium carbonate values therein, introduced prior to filtration of said sodium carbonate-containing streams followed by evaporation/crystallization, increases averaged 0.022 mols/min. uptake of carbon dioxide were achieved.

Also, using the present process with a non-tallow based quaternary amine feed rate of 0.010–0.020 gallons per ton of soda ash recovered, the entire quantity being added to the sodium carbonate-containing stream introduced with the intent of recovering the sodium carbonate values therein, where the process further purified said streams using filtration, introducing the amine prior to said filtration, achieved carbon dioxide uptakes averaging 0.022 mols/min.

Although the present invention has been described in terms of specific embodiments, variations apparent to one skilled in the art may be made without departing from the invention which should be limited only by the scope of the appended claims.

What is claimed is:

1. A method for manufacturing modified sodium carbonate crystals produced from a natural source which comprises the following steps in sequence: a) crushing and calcinating a natural sodium carbonate-containing product; b) dissolving the calcinated product in water; c) decanting the resultant supernatant liquid from solid residues; d) adding a non-tallow based non-fatty substituted cationic quaternary amine salt from the group consisting of dialkylethoxylated quaternary salts, benzylalkyl quaternary salts, and mixtures of these quaternary salts, to the supernatant liquid from step c) at a rate of about 0.020–0.040 gallons per ton of sodium carbonate produced; e) filtering the reaction product from step d); and f) crystallizing sodium carbonate solids from the filtrate of step e).

2. A method according to claim 1 wherein the crystallized solids of step f) is reacted with water and carbon dioxide to produce sodium bicarbonate.

3. The method of claim 1 wherein the quaternary amine is a dialkylethoxylated quaternary salt.

4. A method according to claim 1 wherein a filtrate separated from the crystallized solids in step f) is filtered prior to being reintroduced as a recycle stream to the crystallizing step f), to recover the alkali values therein, the improvement comprising further adding the amine salt at a rate of at least 0.010 gallons per ton of sodium carbonate equivalent produced, prior to the filtration in step e).

5. A method according to claim 1 wherein a filtrate separated from the crystallized solids in step f) is cooled, crystallizing sodium carbonate decahydrate and separating the decahydrate crystals from a weak bittern mother liquor, melting the sodium carbonate decahydrate crystals to recover the alkali values therein, and filtering the resultant liquor prior to recovering the sodium carbonate value with the intent of producing sodium carbonate or other sodium carbonate salts such as sodium bicarbonate or sodium sesquicarbonate, the improvement comprising further adding the amine salt at a rate of at least 0.010 gallons per ton of sodium carbonate equivalent produced, prior to the filtration of said liquor.

6. A method according to claim 1 wherein a purge stream from crystallizing step f) is cooled, crystallizing sodium carbonate decahydrate and separating the decahydrate crystals from a weak bittern mother liquid, melting the sodium bicarbonate decayhdrate crystals to recover their alkali values therein, and filtering the resultant liquor prior to re-introduction into the crystallizing step or prior to processing into other sodium carbonate-containing salt crystals such as sodium bicarbonate or sodium sesquicarbonate, the improvement comprising further adding the amine salt at a rate of at least 0.010 gallons per ton of sodium carbonate equivalent produced, prior to the filtration of said resultant liquor.

7. A method according to claim 1 wherein a filtrate separated from the crystallized solids in step f) is filtered and cooled, crystallizing sodium carbonate decahydrate and separating the decahydrate crystals to recover the alkali values therein to produce sodium carbonate, the improvement comprising further adding the amine salt at a rate of at least 0.010 gallons per ton of sodium carbonate produced, prior to the filtration of said filtrate.

8. A method according to claim 1 wherein a purge stream from crystallizing step f) is filtered and cooled crystallizing sodium carbonate decahydrate and separating the decahydrate crystals from a weak bittern mother liquor, and treating the sodium carbonate decahydrate crystals to recover the alkali values therein, the improvement comprising further adding the amine salt at a rate of at least 0.010 gallons per ton of sodium carbonate equivalent produced, prior to the filtration of said purge stream.

9. A method according to claim 1 wherein a combination of sodium carbonate-containing streams are introduced to step f) to recover alkali values therein, wherein the amine salt is also fed to virgin sodium carbonate liquor prior to filtration of step e).

10. A method according to claim 1 wherein a combination of sodium carbonate-containing streams are introduced prior to step f) to recover alkali values therein, wherein the amine salt is also fed to other sodium carbonate-containing streams to recover sodium carbonate values therein, the amine salt being fed at a rate of at least 0.010 gallons per ton of sodium carbonate equivalent produced, prior to the filtration of step e).

11. A method according to claim 1 wherein said quaternary amine is a mixture of dialklyethoxylated and benzalkyl quaternary salts.

12. In a method of producing sodium carbonate from modified sodium carbonate crystals produced from trona ore wherein the ore is crushed, calcined, dissolved in water and the resultant supernatant liquid is decanted from the solid residue and filtered, the improvement comprising adding a non-tallow based non-fatty substituted amine additive selected from the group consisting of dialkylethoxylated quaternary salts, benzylalkyl quaternary salts, and a combination of these quaternary salts to the supernatant liquid at a rate of about 0.020–0.040 gallons per ton of sodium carbonate produced.

13. A method according to claim 12 wherein the amine is added continuously to the decanted supernatant liquid.

14. A method according to claim 12 wherein the amine is added batchwise to the decanted supernatant liquid.

15. A method according to claim 12 wherein the average uptake of carbon dioxide in the conversion to sodium bicaarbonate from the sodium carbonate produced is 0.022 mols/min.

16. A method according to claim 1 in which the amine salt is further added to a filtrate to be recycled, which is obtained from step f) the improvement comprising adding the quaternary salt at a rate of about 0.010–0.020 gallons per ton of sodium carbonate produced from other sodium carbonate-containing streams to the filtrate of step e) with the purpose of recovering sodium carbonate values therein, prior to the filtration thereof.

17. In a method of producing sodium salts from modified sodium carbonate-containing liquors using a sodium monohydrate, sodium decahydrate, and/or sodium bicarbonate processes that comprise crushing, calcining, dissolving, decanting, and filtering a naterual sodium carbonate containing product to recover alkali values therein, the improvement comprising adding a non-tallow based non-fatty substituted quaternary amine salt selected from the group consisting of dialkylethoxylated quaternary salts, benzylalkyl quaternary salts, and a combination of these quaternary salts to a filtrated from the processes at a rate of from about 0.020 to about 0.040 gallons per ton of sodium carbonate produced and at a rate of about 0.010–0.020 gallons per ton of sodium carbonate produced from other sodium carbonate containing streams to produce sodium carbonate crystals having an increased reactivity with carbon dioxide.

* * * * *